United States Patent
Hirata et al.

(10) Patent No.: US 12,055,210 B2
(45) Date of Patent: Aug. 6, 2024

(54) LUBRICATING DEVICE OF VEHICLE TRANSMISSION SYSTEM

(71) Applicant: TOYOTA JIDOSHA KABUSHIKI KAISHA, Toyota (JP)

(72) Inventors: Marina Hirata, Toyota (JP); Akitaka Ichikawa, Nisshin (JP); Hiroshi Kawanishi, Nisshin (JP); Tsukasa Sakamaki, Toyota (JP); Shohei Nagata, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/142,284

(22) Filed: May 2, 2023

(65) Prior Publication Data
US 2024/0019023 A1  Jan. 18, 2024

(30) Foreign Application Priority Data
Jul. 12, 2022  (JP) .................................. 2022-112062

(51) Int. Cl.
*F16H 57/04* (2010.01)
(52) U.S. Cl.
CPC ....... *F16H 57/0434* (2013.01); *F16H 57/045* (2013.01); *F16H 57/0483* (2013.01)
(58) Field of Classification Search
CPC ............... F16H 57/045; F16H 57/0423; F16H 57/0434; F16H 57/0457
See application file for complete search history.

(56) References Cited

U.S. PATENT DOCUMENTS

| 3,529,698 | A | * | 9/1970 | Nelson | F16H 57/0447 |
| | | | | | 184/6.12 |
| 8,746,405 | B2 | * | 6/2014 | Perakes | F16H 57/0409 |
| | | | | | 184/6.12 |
| 8,899,381 | B2 | * | 12/2014 | Ebihara | F16H 57/0423 |
| | | | | | 184/6.12 |
| 10,859,152 | B2 | * | 12/2020 | Yu | F16H 57/0475 |
| 11,906,033 | B2 | * | 2/2024 | Houser | F16H 57/0424 |
| 2009/0314580 | A1 | * | 12/2009 | Jabs | F16H 57/0447 |
| | | | | | 184/11.1 |
| 2010/0180721 | A1 | * | 7/2010 | Quehenberger | F16H 57/0447 |
| | | | | | 74/606 R |
| 2011/0192245 | A1 | * | 8/2011 | Shioiri | F16H 57/0423 |
| | | | | | 74/467 |
| 2011/0245010 | A1 | * | 10/2011 | Nobata | F16H 57/037 |
| | | | | | 475/160 |

(Continued)

FOREIGN PATENT DOCUMENTS

| JP | 2009-197918 A | 9/2009 |
| JP | 2016-089860 A | 5/2016 |

*Primary Examiner* — Michael A Riegelman
(74) *Attorney, Agent, or Firm* — Oliff PLC

(57) ABSTRACT

In a catch tank, a partition wall is formed that extends along a vehicle front-rear direction and divides the catch tank in a vehicle width direction in a vehicle-mounted state, which helps prevent oil in the catch tank from flowing unevenly to one of a first space and a second space even when the oil surface of the oil tilts during turn of the vehicle, for example. As a result, an appropriate amount of oil required for lubrication is supplied through a second lubrication hole regardless of tilt of the vehicle or turn of the vehicle.

4 Claims, 3 Drawing Sheets

(56) References Cited

U.S. PATENT DOCUMENTS

| | | | |
|---|---|---|---|
| 2012/0096968 A1* | 4/2012 | Kawamoto | F16H 57/0423 74/467 |
| 2015/0152954 A1* | 6/2015 | Kajikawa | F16H 57/042 74/467 |
| 2016/0123454 A1* | 5/2016 | Tahara | F16H 57/0409 74/467 |
| 2019/0003570 A1* | 1/2019 | Graves | F16H 57/0402 |
| 2020/0271194 A1* | 8/2020 | Takahashi | F16H 57/037 |
| 2024/0019023 A1* | 1/2024 | Hirata | F16H 57/0434 |
| 2024/0110620 A1* | 4/2024 | Numazaki | F16H 57/0424 |

* cited by examiner

LUBRICATING DEVICE OF VEHICLE TRANSMISSION SYSTEM

CROSS-REFERENCE TO RELATED APPLICATION

This application claims priority to Japanese Patent Application No. 2022-112062 filed on Jul. 12, 2022, incorporated herein by reference in its entirety.

BACKGROUND

1. Technical Field

The present disclosure relates to a lubricating device included in a vehicle transmission system.

2. Description of Related Art

Many structures have been hitherto proposed as lubricating devices that lubricate lubrication-requiring parts, such as gears and bearings, housed inside a vehicle transmission system. For example, Japanese Unexamined Patent Application Publication No. 2016-89860 (JP 2016-89860 A) discloses a structure in which oil swept up by a gear is temporarily stored in a catch tank, and the oil in the catch tank is supplied to lubrication-requiring parts through a lubrication hole.

SUMMARY

A lubricating device including a catch tank like that of JP 2016-89860 A may have difficulty supplying a required amount of oil to lubrication-requiring parts when the oil surface in the catch tank tilts due to tilt of the vehicle or a centrifugal force applied during turn of the vehicle.

The present disclosure has been contrived in the context of the above-described situation, and an object thereof is to provide a structure of a lubricating device of a vehicle transmission system including a catch tank that can supply an appropriate amount of oil to lubrication-requiring parts even when the oil surface in the catch tank tilts during travel of the vehicle.

The gist of the present disclosure is as follows. (a) A lubricating device of a vehicle transmission system, the lubricating device including a predetermined gear housed inside a case and a catch tank provided inside the case, above the predetermined gear in a vehicle-mounted state, and having a structure in which oil swept up by rotation of the predetermined gear is caught by the catch tank, wherein: (b) the catch tank has a shape elongated in a vehicle front-rear direction in the vehicle-mounted state; (c) in the catch tank, a partition wall is formed that extends along the vehicle front-rear direction and divides the catch tank in a vehicle width direction in the vehicle-mounted state; (d) as the inside of the catch tank is divided by the partition wall, a first space and a second space separated in the vehicle width direction are formed; (e) a first lubrication hole communicating with the first space and a second lubrication hole communicating with the second space are formed on a side of the catch tank in a longitudinal direction opposite from a side where oil swept up by the predetermined gear flows in; and (f) an inclined part that is inclined vertically downward while extending away from the partition wall in the vehicle width direction is formed on the side of the catch tank in the longitudinal direction opposite from the side where oil swept up by the predetermined gear flows in, in at least one of a portion forming the first space and a portion forming the second space.

According to the present disclosure, in the catch tank, the partition wall is formed that extends along the vehicle front-rear direction and divides the catch tank in the vehicle width direction in the vehicle-mounted state, which helps the oil in the catch tank from flowing unevenly to one of the first space and the second space even when the oil surface of the oil tilts during turn of the vehicle, for example, Further, the inclined part that is inclined vertically downward while extending away from the partition wall in the vehicle width direction is formed in at least one of the portion of the catch tank that forms the first space and the portion thereof that forms the second space, so that oil is retained at least in the space on the side where the inclined part is formed even when the oil surface of the oil in the catch tank tilts during turn of the vehicle, for example. As a result, oil can be supplied to lubrication-requiring parts through the first lubrication hole and the second lubrication hole even when the oil surface in the catch tank tilts during travel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described below in detail with reference to the drawings. In the following embodiment, the drawings are simplified or deformed as necessary and parts are not necessarily correctly depicted in terms of their dimensional ratios, shapes, etc.

Figure 1:
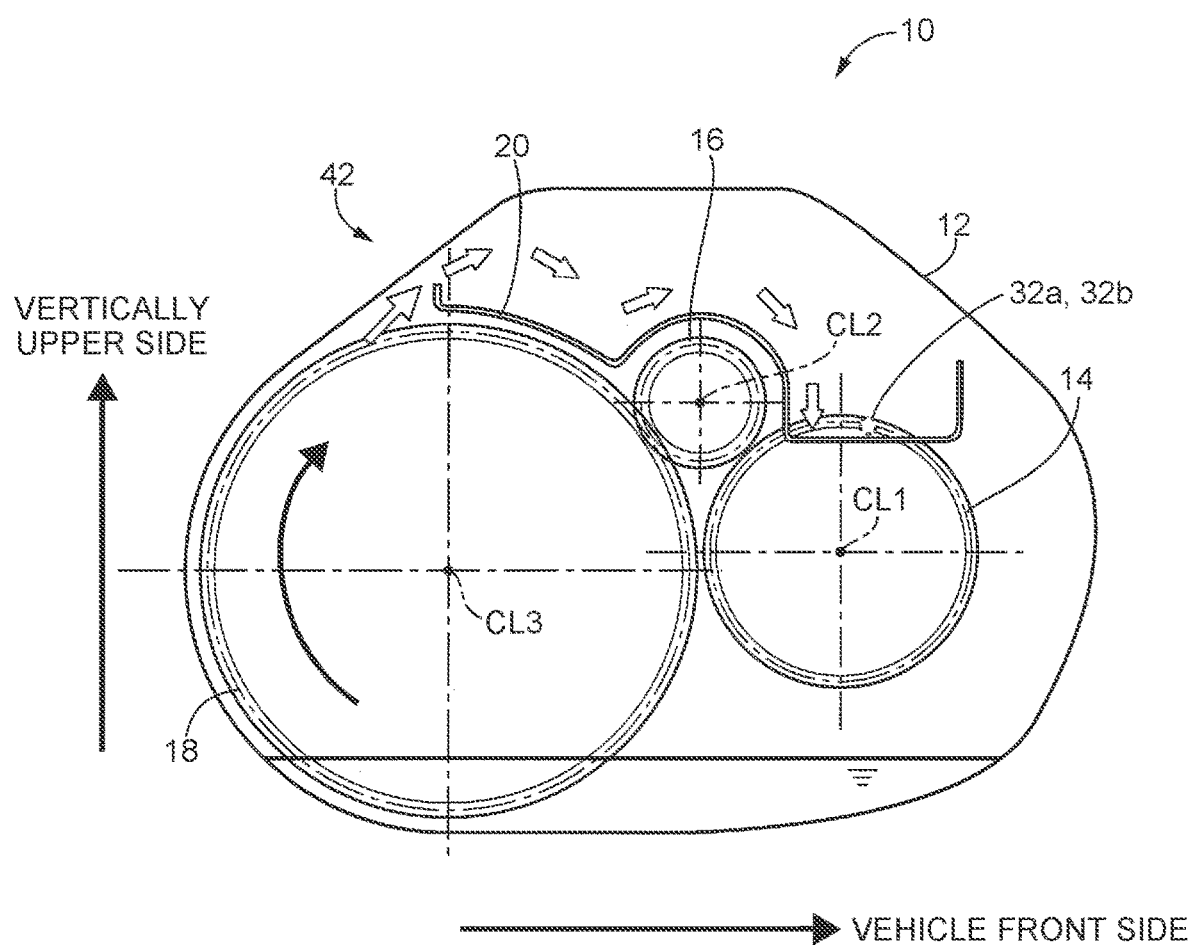
FIG. 1 is a view schematically showing the inside of a vehicle transmission system to which the present disclosure is applied.

FIG. 1 is a view schematically showing the inside of a vehicle transmission system 10 (hereinafter, "transmission system 10") to which the present disclosure is applied. The upper side in the sheet of FIG. 1 corresponds to a vertically upper side in a vehicle-mounted state. The right side in the sheet of FIG. 1 corresponds to a vehicle front side in the vehicle-mounted state. A direction perpendicular to the sheet of FIG. 1 corresponds to a vehicle width direction in the vehicle-mounted state. The vehicle-mounted state in this specification is a state when the vehicle is on a flat road.

The transmission system 10 is applied to, for example, a battery electric vehicle having an electric motor (not shown) as a motive power source. Inside a case 12 of the transmission system 10, an output gear 14, a counter gear 16, and a differential ring gear 18 are housed. The differential ring gear 18 corresponds to the predetermined gear of the present disclosure.

The output gear 14 is connected to, for example, the electric motor (not shown) such that power can be transmitted, and is disposed so as to be rotatable around a rotational axis CL1. The counter gear 16 is disposed so as to be rotatable around a rotational axis CL2. The differential ring gear 18 is disposed so as to be rotatable around a rotational axis CL3. The counter gear 16 and the differential ring gear 18 are meshed with each other. The differential ring gear 18 is integrally formed with a differential case 22a of a well-known differential device 22 (see FIG. 2).

A catch tank 20 is provided vertically above the counter gear 16 and the differential ring gear 18 in the vehicle-mounted state. The catch tank 20 is disposed along part of an outer circumference of the counter gear 16 and part of an outer circumference of the differential ring gear 18, and has a shape elongated in a vehicle front-rear direction in the vehicle-mounted state.

Figure 2:
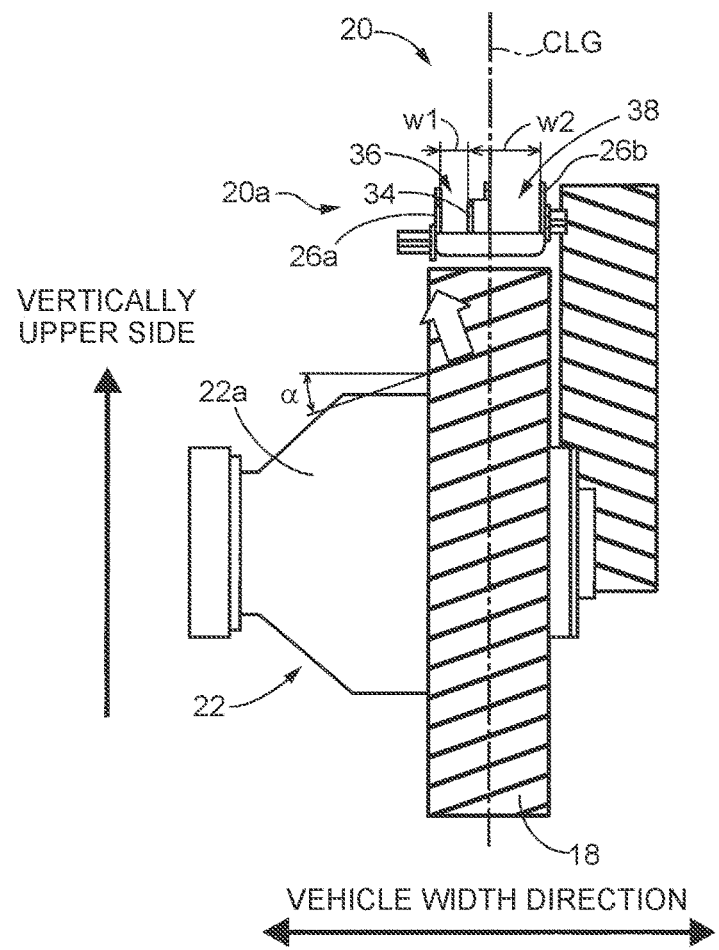
FIG. 2 is a schematic view of a differential ring gear as seen from a rear side in a vehicle advancing direction.

FIG. 2 is a schematic view of the differential ring gear 18 as seen in the vehicle-mounted state from a rear side in a vehicle advancing direction. As shown in FIG. 2, the catch tank 20 is disposed vertically above the differential ring gear 18 in the vehicle-mounted state. In this embodiment, the dimension of the differential ring gear 18 in the vehicle width direction and the dimension of the catch tank 20 in the vehicle width direction are substantially equal dimensions.

Turning back to FIG. 1, oil is stored at a vertically lower part of the case 12, and when the differential ring gear 18 rotates clockwise as indicated by the black arrow during forward travel, the oil stored at the lower part of the case 12 is swept upward by the differential ring gear 18. The blank arrows indicate the flow of the oil swept up. When the oil swept up is discharged through a gap between an inner wall surface of the case 12 and the catch tank 20, this oil is caught by the catch tank 20. The oil caught by the catch tank 20 moves toward the vehicle front side. Then, the oil is discharged through a first lubrication hole 32a and a second lubrication hole 32b indicated by dashed lines. The discharged oil is supplied to lubrication-requiring parts, such as gears and bearings. The first lubrication hole 32a and the second lubrication hole 32b are through-holes that are respectively formed in wall portions (of a second vertical wall 30 to be described later) forming both ends in the vehicle width direction and extend through these wall portions. The first lubrication hole 32a and the second lubrication hole 32b are formed at a lower part of the catch tank 20 in the vertical direction in the vehicle-mounted state.

Figure 3:
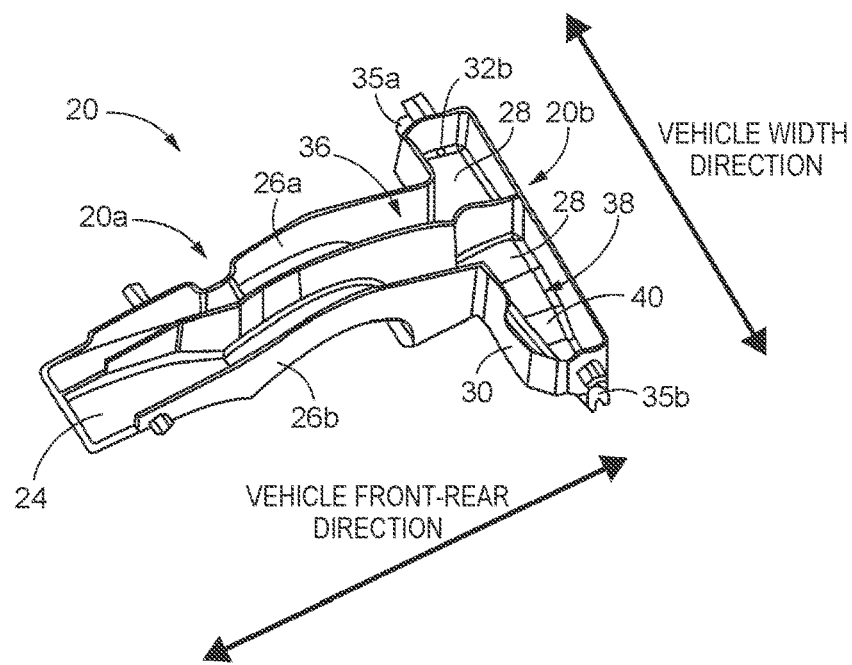
FIG. 3 is a perspective view of a catch tank.
Figure 4:
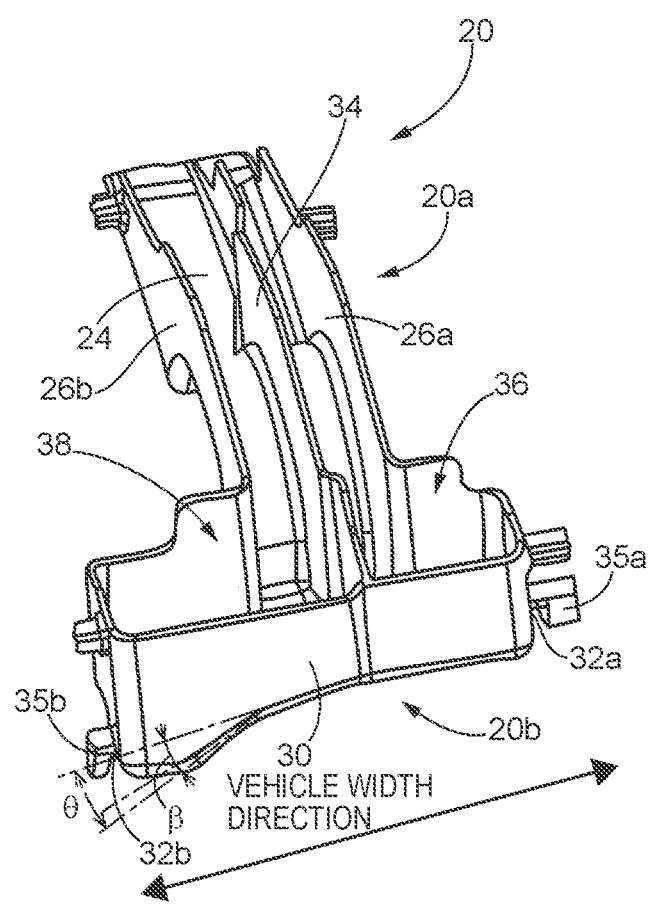
FIG. 4 is a perspective view of the catch tank as seen from a different direction from FIG. 3.

FIG. 3 and FIG. 4 are both perspective views of the catch tank 20. The vehicle width direction and the vehicle front-rear direction indicated in FIG. 3 and FIG. 4 both indicate directions in the vehicle-mounted state.

The catch tank 20 is composed of a guide part 20a that extends so as to be elongated in the vehicle front-rear direction in the vehicle-mounted state, and a tank part 20b that is connected to one end of the guide part 20a in a longitudinal direction. The tank part 20b extends toward both sides in the vehicle width direction.

The guide part 20a is formed by a first bottom wall 24 that forms a lower part in the vertical direction in the vehicle-mounted state, and a pair of first vertical walls 26a, 26b that is erected vertically upward from both edges of the first bottom wall 24 in the vehicle width direction.

The first bottom wall 24 is disposed vertically above the counter gear 16 and the differential ring gear 18 in the vertical direction in the vehicle-mounted state, and has a shape conforming to the shape of the outer circumference of the counter gear 16 and the shape of the outer circumference of the differential ring gear 18. The first bottom wall 24 has a predetermined dimension in the vehicle width direction.

The pair of first vertical walls 26a, 26b is erected vertically upward from both edges of the first bottom wall 24 in the vehicle width direction. The pair of first vertical walls 26a, 26b extends so as to be elongated in the vehicle front-rear direction respectively along the edges of the first bottom wall 24. The pair of first vertical walls 26a, 26b is formed so as to face each other. As the pair of first vertical walls 26a, 26b is formed, oil swept up by rotation of the differential ring gear 18 flows into the catch tank 20 from a leading end of the guide part 20a. In other words, the oil swept up is caught by the catch tank 20.

The tank part 20b is connected to the side of the guide part 20a in the longitudinal direction opposite from the side where the oil swept up flows in. The tank part 20b extends toward both sides in the vehicle width direction in the vehicle-mounted state. The tank part 20b includes a second bottom wall 28 that forms a lower part in the vertical direction in the vehicle-mounted state, and the second vertical wall 30 that is erected vertically upward so as to surround an outer edge of the second bottom wall 28. The second bottom wall 28 corresponds to the bottom wall of the present disclosure.

The second bottom wall 28 has a rectangular shape extending along the vehicle width direction in the vehicle-mounted state. A center portion of the second bottom wall 28 in the vehicle width direction is connected to an end portion of the first bottom wall 24.

The second vertical wall 30 surrounds the outer edge of the second bottom wall 28 except for the portion where the first bottom wall 24 and the second bottom wall 28 are connected to each other. Of both end portions of the second vertical wall 30 in the surrounding direction, one end portion is connected to the first vertical wall 26a and the other end portion is connected to the first vertical wall 26b. As a result, a T-shaped space is formed inside the catch tank 20 by the guide part 20a and the tank part 20b. The first lubrication hole 32a and the second lubrication hole 32b shown in FIG. 1 are respectively formed in the wall portions of the second vertical wall 30 that form both ends in the vehicle width direction.

A first protrusion 35a that covers the opening of the first lubrication hole 32a and a second protrusion 35b that covers the opening of the second lubrication hole 32b are formed on the second vertical wall 30. Oil having flowed into the catch tank 20 passes through the guide part 20a and the tank part 20b, and is then discharged to an outside of the catch tank 20 through the first lubrication hole 32a and the second lubrication hole 32b and supplied to lubrication-requiring parts, such as gears and bearings, housed inside the case 12. Thus, a lubricating device 42 that supplies oil to those lubrication-requiring parts is configured with the catch tank and the differential ring gear 18 included.

When the vehicle turns, for example, the oil in the catch tank 20 may flow unevenly to one side in the vehicle width direction and the oil may fail to be supplied through one of the first lubrication hole 32a and the second lubrication hole 32b. As a countermeasure, a partition wall 34 that divides the inside of the catch tank 20 in the vehicle width direction is formed at the center of the guide part 20a and the tank part 20b of the catch tank 20 in the vehicle width direction.

The partition wall 34 is erected vertically upward from the first bottom wall 24 and the second bottom wall 28 in the vehicle-mounted state. The partition wall 34 is formed so as to extend along the vehicle front-rear direction and divide the inside of the catch tank 20 in the vehicle width direction in the vehicle-mounted state. As the inside of the catch tank 20 is divided by the partition wall 34, a first space 36 and a second space 38 separated in the vehicle width direction are formed inside the catch tank 20. Each of the first space 36 and the second space 38 is an L-shaped space. In this relation, the first space 36 communicates with the first lubrication hole 32a and the second space 38 communicates with the second lubrication hole 32b. The first lubrication hole 32a is formed in a wall portion of the second vertical wall 30 that is located on the side of the first space 36 and faces the partition wall 34, and the second lubrication hole 32b is formed in a wall portion of the second vertical wall 30 that is located on the side of the second space 38 and faces the partition wall 34.

Forming the partition wall 34 helps prevent the oil stored in the catch tank from flowing unevenly to one side of the tank part 20b in the vehicle width direction even when the oil surface of the oil tilts while the vehicle travels so as to turn, for example. Thus, it helps prevent the situation where oil fails to be supplied through one of the first lubrication hole 32a and the second lubrication hole 32b.

Here, as shown in FIG. 2, a helix angle α is formed in the differential ring gear 18. Accordingly, when oil is swept up by the differential ring gear 18, the oil is swept up along the tooth flank of the differential ring gear 18 and therefore scatters in the direction indicated by the arrow in FIG. 2. As a result, the amount of oil flowing into the first space 36 that is located on the side in the vehicle width direction where the oil swept up by the differential ring gear 18 scatters becomes larger than the amount of oil flowing into the second space 38 that is located on the side in the vehicle width direction opposite from the side where the oil scatters.

As a countermeasure, to equalize the amounts of oil flowing into the first space 36 and the second space 38, a portion of the partition wall 34 that is located on the side in the longitudinal direction where the oil swept up flows in is offset toward the first space 36 (or the first vertical wall 26a) relative to the center of the pair of first vertical walls 26a, 26b located at both ends of the catch tank 20 in the vehicle width direction. Further, in this embodiment, the portion of the partition wall 34 that is located on the side in the longitudinal direction where the oil swept up flows in is offset toward the first space 36 (or the first vertical wall 26a) relative to a centerline CLG of the differential ring gear 18 in the vehicle width direction. The first vertical walls 26a, 26b correspond to the walls of the present disclosure that are located at both ends of the catch tank in the vehicle width direction.

Thus, as shown in FIG. 2, an oil inflow width w1 in the first space 36 becomes smaller than an oil inflow width w2 in the second space 38 on the side of the guide part 20a in the longitudinal direction where the oil flows in. This results in an increase in the amount of oil that is part of the oil swept up by the differential ring gear 18 and flows into the second space 38. In this relation, it becomes also possible to equalize the ratio between the oil flowing into the first space 36 and the oil flowing into the second space 38. The amount of offset of the partition wall 34 is obtained beforehand through experiment or design. For example, the amount of offset is set to such a value that the ratio between the oil flowing into the first space 36 and the oil flowing into the second space 38 becomes substantially equal.

Further, as shown in FIG. 3, an inclined part 40 that is inclined vertically downward while extending away from the partition wall 34 in the vehicle width direction is formed on the side of the catch tank 20 in the longitudinal direction opposite from the side where oil flows in, in a portion that forms the second space 38, i.e., a portion of the tank part 20b of the catch tank 20 that forms the second space 38. Specifically, the inclined part 40 that is inclined vertically downward while extending away from the partition wall 34 in the vehicle width direction is formed in the second bottom wall 28 of the catch tank 20 that extends in the vehicle width direction from the partition wall 34 toward the second lubrication hole 32b. Thus, the second bottom wall 28 that extends in the vehicle width direction from the partition wall 34 toward the second lubrication hole 32b is located farther vertically downward as it extends farther away from the partition wall 34.

In this configuration, even when the amount of oil flowing in on the side of the second space 38 becomes small, the oil is retained in the tank part 20b on the side of the second space 38 and oil to be discharged through the second lubrication hole 32b is secured. As a result, even in the second space 38 in which the amount of oil flowing in tends to be smaller than that in the first space 36, oil to be retained in the second space 38 can be secured. In this relation, the lubrication performance of the lubricating device 42 can be secured, and also the size of the catch tank 20 can be reduced. An angle of inclination θ (see FIG. 4) formed by the inclined part 40 and a horizontal plane intersecting each other in the vehicle-mounted state is set to be equal to or larger than a predetermined angle β (θ≥β) that is obtained beforehand through experiment or design. For example, the predetermined angle β is set to a lower limit threshold in a range of angle in which an amount of oil equal to or larger than a predetermined amount is retained in the tank part on the side of the second space 38 even when oil has become uneven due to turn of the vehicle or tilt of the vehicle.

As has been described above, according to this embodiment, the partition wall 34 that extends in the vehicle front-rear direction and divides the catch tank 20 in the vehicle width direction in the vehicle-mounted state is formed in the catch tank 20, which helps prevent the oil in the catch tank 20 from flowing unevenly to one of the first space 36 and the second space 38 even when the oil surface of the oil tilts during turn of the vehicle, for example. Further, the inclined part 40 that is inclined vertically downward while extending away from the partition wall 34 in the vehicle width direction is formed in the portion of the catch tank 20 that forms the second space 38, so that oil is retained in the second space 38 located on the side where the inclined part 40 is formed even when the oil surface of the oil in the catch tank 20 tilts during turn of the vehicle, for example. As a result, oil can be supplied to the lubrication-requiring parts through the second lubrication hole 32b even when the oil surface in the catch tank 20 tilts during travel.

Since the portion of the partition wall 34 that is located on the side of the catch tank 20 in the longitudinal direction where oil swept up by the differential ring gear 18 flows in is offset toward the first space 36 relative to the center of the pair of first vertical walls 26a, 26b located at both ends of the catch tank 20 in the vehicle width direction, an appropriate amount of oil flows in also on the side of the second space 38, and the amounts of oil flowing into the first space 36 and the second space 38 are equalized. Further, since the angle of inclination θ formed by the inclined part 40 and a horizontal plane in the vehicle-mounted state intersecting each other is set to be equal to or larger than the predetermined angle θ that is set beforehand, an appropriate amount of oil is secured in the second space 38 regardless of turn of the vehicle or tilt of the vehicle.

While the embodiment of the present disclosure has been described in detail above based on the drawings, the present disclosure having other aspects is also applicable.

For example, in the above-described embodiment, the inclined part 40 that is inclined vertically downward while extending away from the partition wall 34 in the vehicle width direction is formed in the portion of the catch tank 20 that forms the second space 38. However, the present disclosure is not necessarily limited to this aspect. For example, the inclined part 40 that is inclined vertically downward while extending away from the partition wall 34 in the vehicle width direction may be formed in the portion of the catch tank 20 that forms the first space 36, or the inclined part 40 may be formed in both the portions of the catch tank 20 that form the first space 36 and the second space 38.

While the helix angle α is formed in the differential ring gear 18 in the above-described embodiment, the helix angle α need not necessarily be formed. In this case, the partition wall 34 located on the side where oil swept up by the differential ring gear 18 flows in need not necessarily be offset, and the partition wall 34 may be formed between the pair of first vertical walls 26a, 26b in the vehicle width direction.

While the first lubrication hole 32a and the second lubrication hole 32b are formed in the second vertical wall 30 forming a portion of the tank part 20b in the above-described embodiment, the first lubrication hole 32a and the second lubrication hole 32b may instead be formed in the second bottom wall 28.

The embodiment having been described above is merely one embodiment, and the present disclosure can be implemented with various modifications and improvements made to its aspects based on the knowledge of those skilled in the art.

What is claimed is:

1. A lubricating device of a vehicle transmission system, the lubricating device comprising a predetermined gear housed inside a case and a catch tank provided inside the case, above the predetermined gear in a vehicle-mounted state, and having a structure in which oil swept up by rotation of the predetermined gear is caught by the catch tank, wherein:
    the catch tank has a shape elongated in a vehicle front-rear direction in the vehicle-mounted state;
    in the catch tank, a partition wall is formed that extends along the vehicle front-rear direction and divides the catch tank in a vehicle width direction in the vehicle-mounted state;
    as an inside of the catch tank is divided by the partition wall, a first space and a second space separated in the vehicle width direction are formed;
    a first lubrication hole communicating with the first space and a second lubrication hole communicating with the second space are formed on a side of the catch tank in a longitudinal direction opposite from a side where oil swept up by the predetermined gear flows in; and
    an inclined part that is inclined vertically downward while extending away from the partition wall in the vehicle width direction is formed on the side of the catch tank in the longitudinal direction opposite from the side where oil swept up by the predetermined gear flows in, in at least one of a portion forming the first space and a portion forming the second space.

2. The lubricating device of a vehicle transmission system according to claim 1, wherein:
    a helix angle is formed in the predetermined gear;
    the first space is located on a side in the vehicle width direction where oil swept up by the predetermined gear scatters, while the second space is located on a side in the vehicle width direction opposite from the side where the oil scatters;
    the inclined part is formed in the portion of the catch tank that forms the second space; and
    a portion of the partition wall that is located on the side of the catch tank in the longitudinal direction where oil swept up by the predetermined gear flows in is offset toward the first space relative to a center of walls located at both ends of the catch tank in the vehicle width direction.

3. The lubricating device of a vehicle transmission system according to claim 1, wherein an angle of inclination formed by the inclined part and a horizontal plane intersecting each other in the vehicle-mounted state is set to be equal to or larger than a predetermined angle that is set beforehand.

4. The lubricating device of a vehicle transmission system according to claim 1, wherein the catch tank is disposed vertically above the predetermined gear in the vehicle-mounted state.

* * * * *